Patented May 17, 1927.

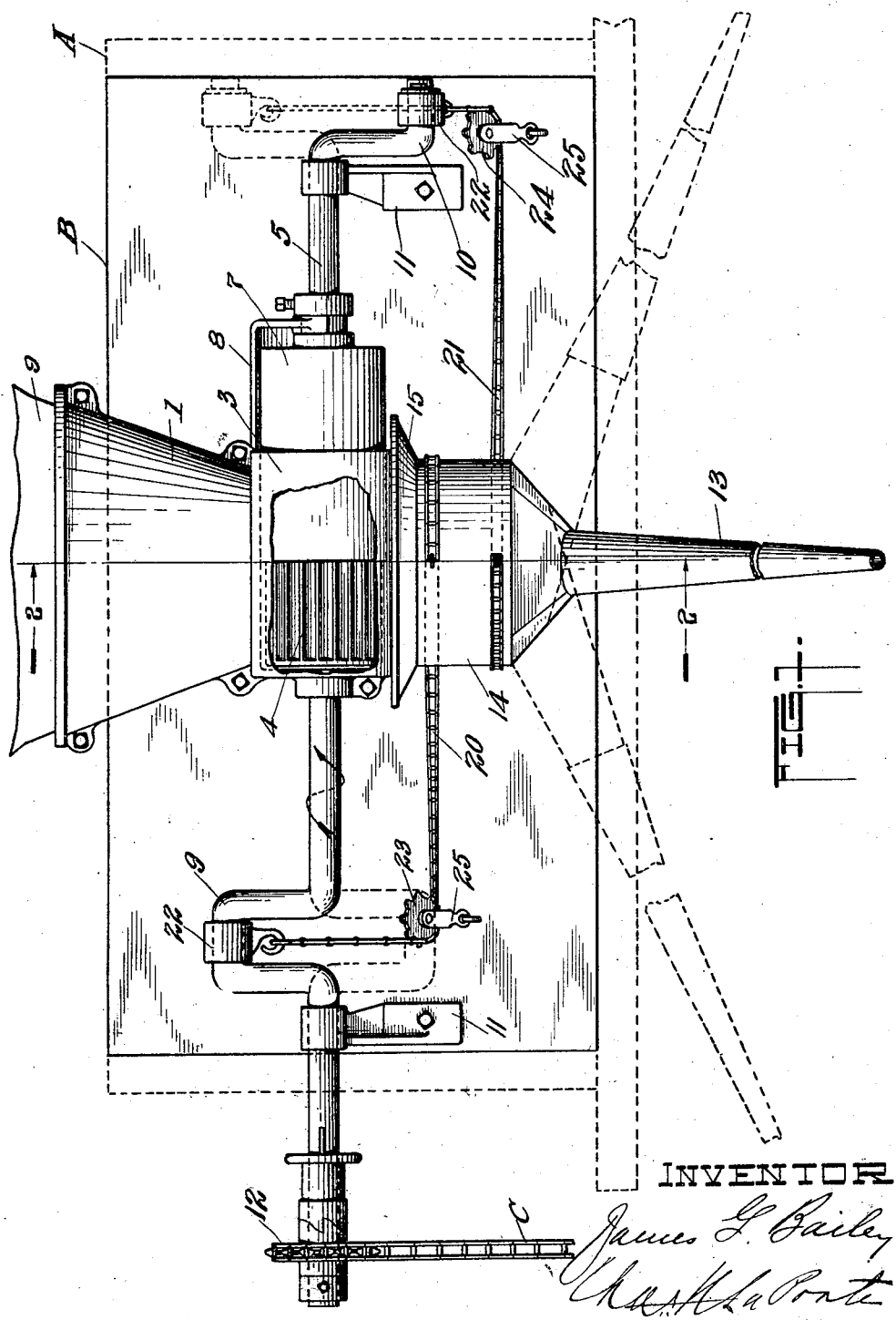

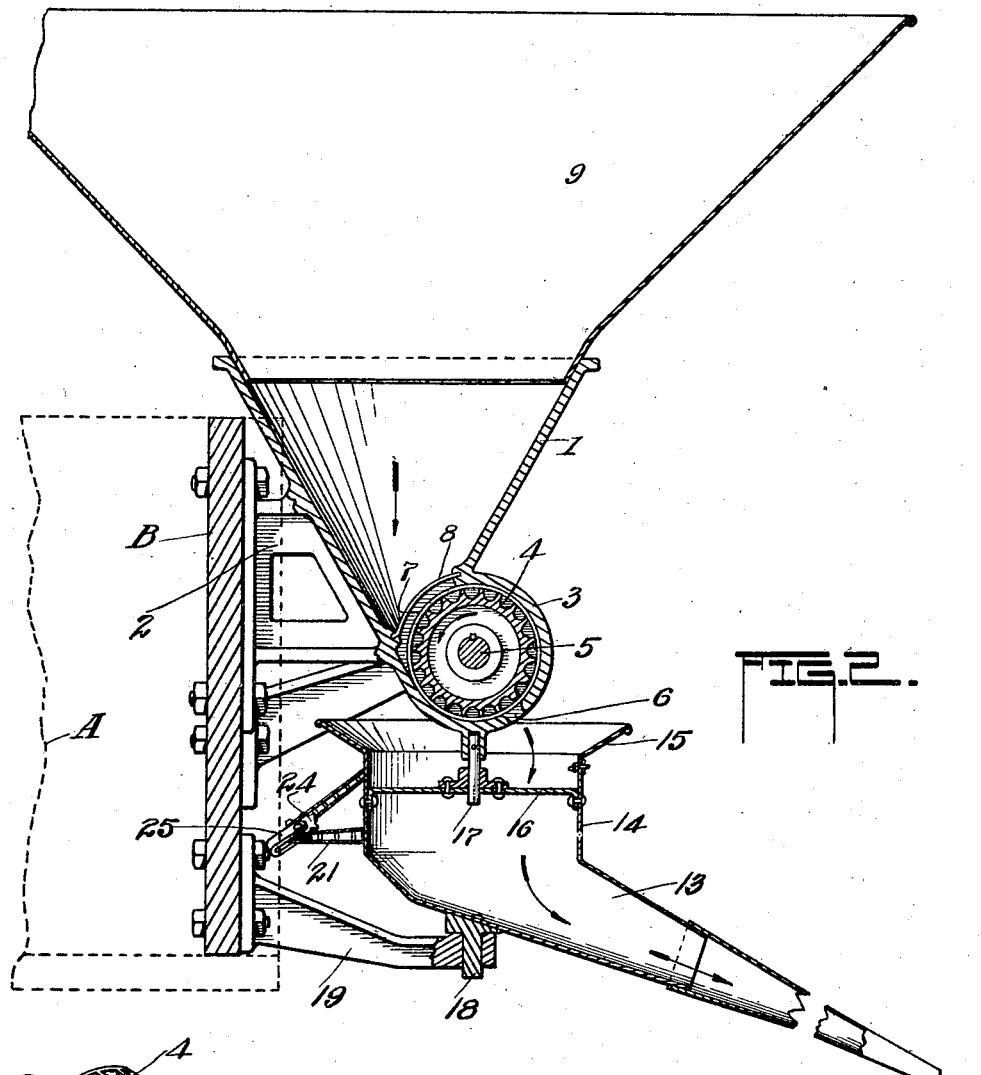

1,629,247

UNITED STATES PATENT OFFICE.

JAMES G. BAILEY, OF DELEVAN, ILLINOIS, ASSIGNOR TO UNIVERSAL BROADCASTER MFG. CO., OF EAST PEORIA, ILLINOIS, A CORPORATION OF ILLINOIS.

SEED OR FERTILIZER DISTRIBUTING MACHINE.

Application filed September 13, 1924. Serial No. 737,461.

This invention has reference to a seed or fertilizer distributing machine.

It has for its principal object to improve machines of the broadcast distributing type.

A further object of the invention is to provide such a machine with a distributing spout, in lieu of the usual or ordinary broadcasting fan or fans, said spout being mounted to swing or be oscillated alternately in opposite direction, and to be operated from the shaft which actuates the feeding means, and which in turn is operated from the ground wheel of a wagon.

The employment of a swingable spout, in lieu of the usual fan or fans, reduces considerably the speed of operation of the distributing means and prevents the operating parts from becoming covered or clogged with dirt and grit. Furthermore, by the use of the swinging spout sowing or distributing may be done in the presence of a much stronger wind, than could be done with the usual fan or fans.

That the invention may be more fully understood, reference is had to the accompanying drawings forming a part of the present description, illustrating a preferred embodiment of the invention, in which:—

Figure 1 is an elevation of my improved distributing machine, partly in section and with the spout shown in different positions, in dotted lines, and the whole structure shown supported on a wagon end-gate;

Figure 2 is a cross-section as the same would appear if taken on the line 2—2 Figure 1, and Figure 3 is a perspective, partly broken away, showing the fluted feed roller and controlling slide valve for regulating or shutting off the supply of seed or fertilizer.

Like characters of reference denote corresponding parts throughout the figures.

In the drawings, the outline of the rear portion of a wagon is designated A arranged to be closed by an end-gate or tail-board B which is ordinarily arranged to be removably supported on the wagon and which supports and to which is secured the distributing machine.

My machine includes a hopper-like-casing 1 supported by a bracket 2 on the end-gate B. The lower portion of the casing 1 is tubular-like in construction and forms a housing 3 for a preferably revoluble fluted-feed-roller 4 connected to rotate with a shaft 5 passing through and having a bearing in the end walls of the housing 3. Said housing being provided with a discharge opening 6. To control or regulate the feed of the seed or fertilizer by the roller 4 I provide the adjustable sleeve 7 and cut-off valve 8 both being adjustable on the shaft 5, as shown. A containing hopper 9 is supported by the casing 1.

The foregoing described structure is not unlike similar structures heretofore used, with which I am familiar.

The shaft 5 is properly a crank-shaft with the crank portions 9 and 10 respectively, at or near its opposite ends diametrically placed. Said shaft having a journal bearing in brackets 11 secured to the end-gate B, and one end of the shaft having a clutch connected sprocket wheel 12 intended to be driven from the ground wheel of the wagon A by means of a sprocket chain C, as in similar cases.

13 designates a distributing spout, which may or may not have extensible sections, but which is preferably tapered towards its outer or discharge end and also preferably inclined downwardly from the feeding means so as to bring the discharge end close to the ground. The inner end of said spout is connected with a preferably cylindrical casing 14 with a hopper neck 15 located or placed immediately below the housing 3 so as to receive the material discharged through the opening 6 in the wall thereof. The casing 14 is provided with a spider bearing arm 16 therewithin forming a journal for a short vertically disposed stud 17 depending from the housing 3, and secured to and depending from the spout 13 in axial alignment with the stud 17, is a stud 18 journaled in a bracket 19 secured to the end-gate B. This mounting for the spout 13 and its casing 14, as will be observed, will permit the same to be swung back and forth, alternately in opposite directions, as shown in the full and dotted line positions in Figure 1. Such swinging of the spout is accomplished through the crank-shaft 5 and connections I will now describe.

Connected to the casing 14 of the spout 13 are chains 20 and 21, the former leading to the crank 9 of the shaft 5, and the latter leading to the crank 10 of said shaft, and the ends of the respective chains coupled with sleeves 22 loose on the crank portions of said shaft. The chain 20 is guided to the crank portion 9 of the shaft 5 by means of a guide wheel 23, and the chain 21 is guided to the crank portion 10 of the shaft 5 by means of a guide wheel 24, and both said guide wheels 23 and 24 are carried by supports 25 having a flexible connection with the end-gate B. This will permit the guiding wheels for the chains 20 and 21 to accommodate themselves to the movement of the crank-shaft 5.

In operation, as the shaft 5 is rotated, the casing 14 is oscillated, first in one direction and then in an opposite direction and with it the spout 13 as shown in the full and dotted lines in Figure 1. Under ordinary conditions the swing of this spout should be about six feet and by reason of its discharge end being so close to the ground sowing can be done in a much stronger wind and under more unfavorable conditions than can sowing be done by means of the usual fan or fans. Furthermore, as has been pointed out the speed of operation can be materially reduced, which is desirable, and by the use of a device such as this clogging or covering of the operating parts with dirt and grit is entirely obviated.

What I claim is:—

1. In a distributing machine of the type set forth, feeding means, a spout disposed below the feeding means to receive material therefrom, means for swingably supporting the spout, flexible members connected to the spout and extending in opposite directions therefrom, means to operate the feeding means, and means to connect the flexible members to said operating means, whereby upon movement of the operating means, one of the flexible members will positively swing the spout in one direction, while the other flexible member idles, and vice versa.

2. In a distributing machine of the type set forth, feeding means, a spout arranged to receive material from the feeding means, means to swingably mount the spout, operating means for the feeding means, and flexible members connected to the spout at one end and to the operating means at their other ends, said flexible members being windable about the spout and being connected to the latter, so that as one of said flexible members is wound about the spout, the other of said flexible members will be unwound from the spout.

3. In a distributing machine of the character described, in combination, an end-gate, a feeding means supported by said end-gate, a spout swingably supported on said end-gate and having a receiving casing immediately below the feeding means, a shaft for operating said feeding means and provided with crank-portions diametrically positioned with respect to each other, and flexible members connecting said crank-portions of said shaft with the casing of said spout, whereby as said shaft is operated said spout will be oscillated alternately in opposite directions.

In witness whereof, I have hereunto affixed my hand this 30th day of August, 1924.

JAMES G. BAILEY.